(12) United States Patent
Sato (10) Patent No.: US 10,404,867 B2
(45) Date of Patent: Sep. 3, 2019

(54) SYSTEM AND INFORMATION PROCESSING METHOD (71) Applicant: CANON KABUSHIKI KAISHA, Tokyo (JP)

(72) Inventor: Tomoya Sato, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/018,309

(22) Filed: Jun. 26, 2018

(65) Prior Publication Data
US 2019/0007562 A1 Jan. 3, 2019

(30) Foreign Application Priority Data

Jun. 30, 2017 (JP) .................. 2017-129624

(51) Int. Cl.
H04N 1/00 (2006.01)
H04N 1/32 (2006.01)

(52) U.S. Cl.
CPC ..... *H04N 1/00029* (2013.01); *H04N 1/00037* (2013.01); *H04N 1/00084* (2013.01); *H04N 1/00164* (2013.01); *H04N 1/3263* (2013.01)

(58) Field of Classification Search
CPC combination set(s) only.
See application file for complete search history.

(56) References Cited

U.S. PATENT DOCUMENTS

2017/0123736 A1* 5/2017 Park .................. G06F 3/121

FOREIGN PATENT DOCUMENTS

JP 2007080035 A 3/2007

* cited by examiner

*Primary Examiner* — Helen Zong
(74) *Attorney, Agent, or Firm* — Carter, DeLuca & Farrell LLP (57) ABSTRACT A remote maintenance system is provided that makes it easy to comprehend support received from an operator. In this system, an image forming apparatus receives an image of the image forming apparatus that is photographed by a mobile terminal from the mobile terminal, transmits the image of the image forming apparatus to an operator terminal, receives support information from the operator terminal, and transmits the support information to the mobile terminal. The mobile terminal photographs the image forming apparatus, transmits the photographed image of the image forming apparatus to the image forming apparatus, receives support information from the image forming apparatus, and based on coordinate information included in the support information, superimposes and displays a guide image included in the support information and the photographed image of the image forming apparatus.

3 Claims, 10 Drawing Sheets

SYSTEM AND INFORMATION PROCESSING METHOD

BACKGROUND OF THE INVENTION

Field of the Invention

The present invention relates to a system and an information processing method.

Description of the Related Art

As the way of dealing with problems which users have when using products is becoming more complicated, users frequently contact the call centers of manufacturers to receive answers to questions. In order to promptly deal with problems of such kind, a remote maintenance system that is provided between an image forming apparatus and a call center has been devised (Japanese Patent Application Laid-Open No. 2007-80035). The remote maintenance system is a system that, when a problem arises in an image forming apparatus, makes it easy to solve the problem from a remote location without a staff member on the call center side visiting the location at which the image forming apparatus is installed. Because time is not taken to travel to the installation location, it is possible to shorten the time until the problem is solved.

For example, a case is conceivable in which a paper jam (jam) occurs within an image forming apparatus, and the user does not know what procedure to follow to remove the jammed paper, and therefore the user calls a call center to ask for support. An operator at the call center checks the state of the image forming apparatus from a remote location, and is also given an oral description of the situation by the user, and the operator then identifies the place at which the has jam occurred. Support for removing the jammed paper can also be performed by means of the operator transmitting an image from a manual that describes a procedure for removing the jam to the image forming apparatus from the call center, and displaying the image on a UI screen of the image forming apparatus.

However, the user must perform the maintenance procedure while checking the transmitted image from the manual against the situation in the actual machine, and in some cases it cannot be said that it is easy for the user to understand what to do.

SUMMARY OF THE INVENTION

The present invention is a system that includes an image forming apparatus, a mobile terminal and an operator terminal, wherein: the image forming apparatus receives from the mobile terminal an image of the image forming apparatus that is photographed by the mobile terminal, transmits the image of the image forming apparatus to the operator terminal, receives support information from the operator terminal, and transmits the support information to the mobile terminal; and the mobile terminal photographs the image forming apparatus, transmits an image of the image forming apparatus obtained by the photographing to the image forming apparatus, receives the support information from the image forming apparatus, and based on coordinate information included in the support information, superimposes and displays a guide image included in the support information and the photographed image of the image forming apparatus.

According to the present invention, the support of an operator can be made easy to comprehend.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

Embodiment 1

Figure 1:
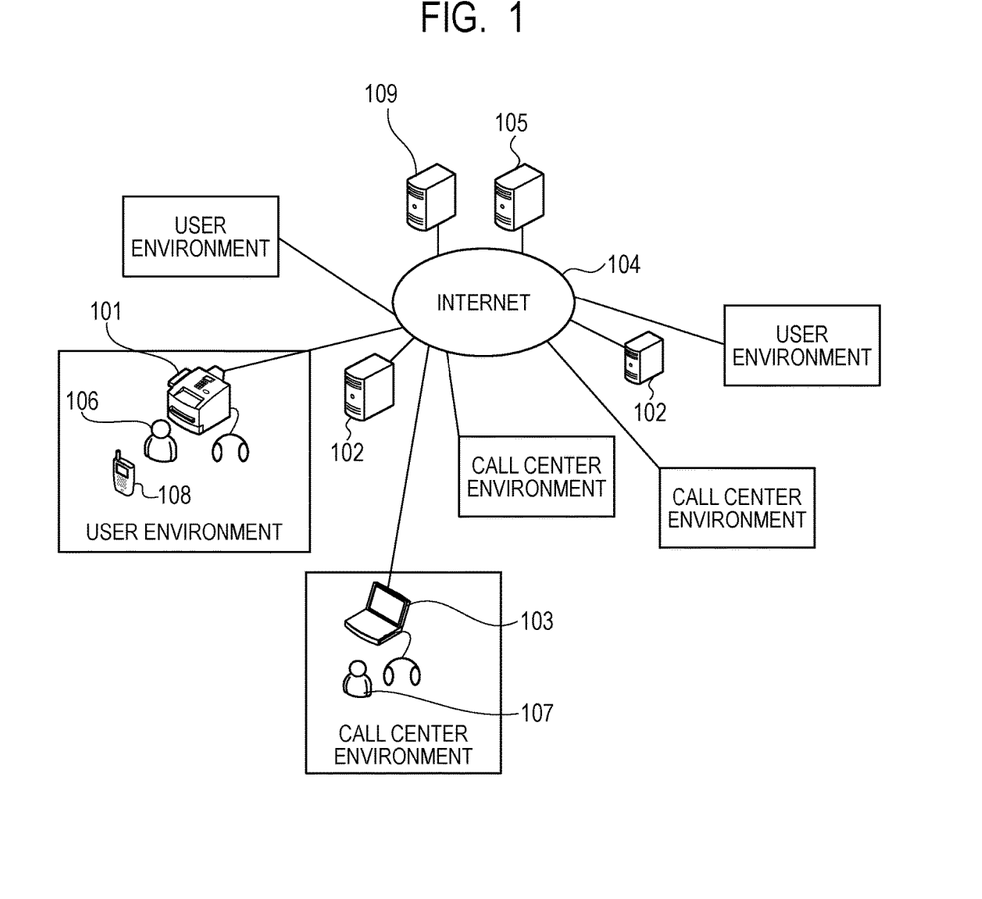
FIG. 1 is a view illustrating an example of the system configuration of a remote maintenance system.

FIG. 1 is a view illustrating an example of the system configuration of a remote maintenance system. In the remote maintenance system, an image forming apparatus 101, a relay server 102, an operator terminal 103, a URL management server 105 and an authentication server 109 are communicably connected to each other through the Internet 104. The image forming apparatus 101 has remote maintenance functions such as remote operation and audio or video communication. The operator terminal 103 operates as a communication counterpart of the image forming apparatus 101 at the time of remote maintenance. The relay server 102 includes a communication function as a HTTP server. The relay server 102 relays communication between the image forming apparatus 101 and the operator terminal 103. The image forming apparatus 101 and the operator terminal 103 include a communication function as a HTTP client. When performing data communication by HTTP, HTTP clients conduct data communication with each other by performing POST/GET to a URL (Uniform Resource Locator) that is provided from a HTTP server. By this means, the HTTP clients can conduct data communication with each other even if the communication is obstructed by a private address area or a firewall. The image forming apparatus 101 and the operator terminal 103 have an audio device. By this means, a user 106 and an operator 107 can have a voice conversation during remote maintenance. The mobile terminal 108 is a smart device such as a smartphone or a tablet, and contains a built-in camera for photographing moving images and still images. The authentication server 109 is a server that provides an authentication function. When connecting to the relay server 102, the image forming apparatus 101 and the operator terminal 103 must perform authentication with the authentication server 109 beforehand and obtain authentication token information. The URL management server 105 is a server that manages URLs of the relay server. When connecting to the relay server 102, the image forming apparatus 101 and the operator terminal 103 obtain a URL of the relay server in advance from the URL management server 105. However, a configuration may also be adopted which does not use the URL management server 105, and instead the user 106 and the operator 107 set the URL of the relay server in advance in the image forming apparatus 101 and the operator terminal 103. Although the image forming apparatus 101 and the operator terminal 103 respectively make a connection to the relay server 102, the relay server 102 side must identify both the image forming apparatus 101 and the operator terminal 103 as communication counterparts. In the present embodiment a method that uses connection numbers is adopted as a method for identifying communication counterparts. When the image forming apparatus 101 connects to the relay server 102, the relay server 102 issues a connection number. When the operator terminal 103 is connecting to the relay server 102, the operator terminal 103 specifies the aforementioned connection number. The relay server 102 identifies devices that have matching connection numbers as communication counterparts. Although the image forming apparatus 101 is adopted as the apparatus to which the connection number is originally issued, a configuration may also be adopted in which the operator terminal 103 is the apparatus to which the connection number is originally issued and the image forming apparatus 101 specifies the connection number. It is assumed that the connection number is separately conveyed between the user 106 and the operator 107 by means of a telephone conversation or electronic mail. In the present embodiment, a configuration is adopted in which the image forming apparatus 101 and the operator terminal 103 communicate using HTTP via the relay server 102. However, the protocol that is used for communication with the relay server 102 may be a protocol other than HTTP, and a configuration may also be adopted in which the image forming apparatus 101 and the operator terminal 103 communicate directly without communicating via the relay server 102.

Figure 2:
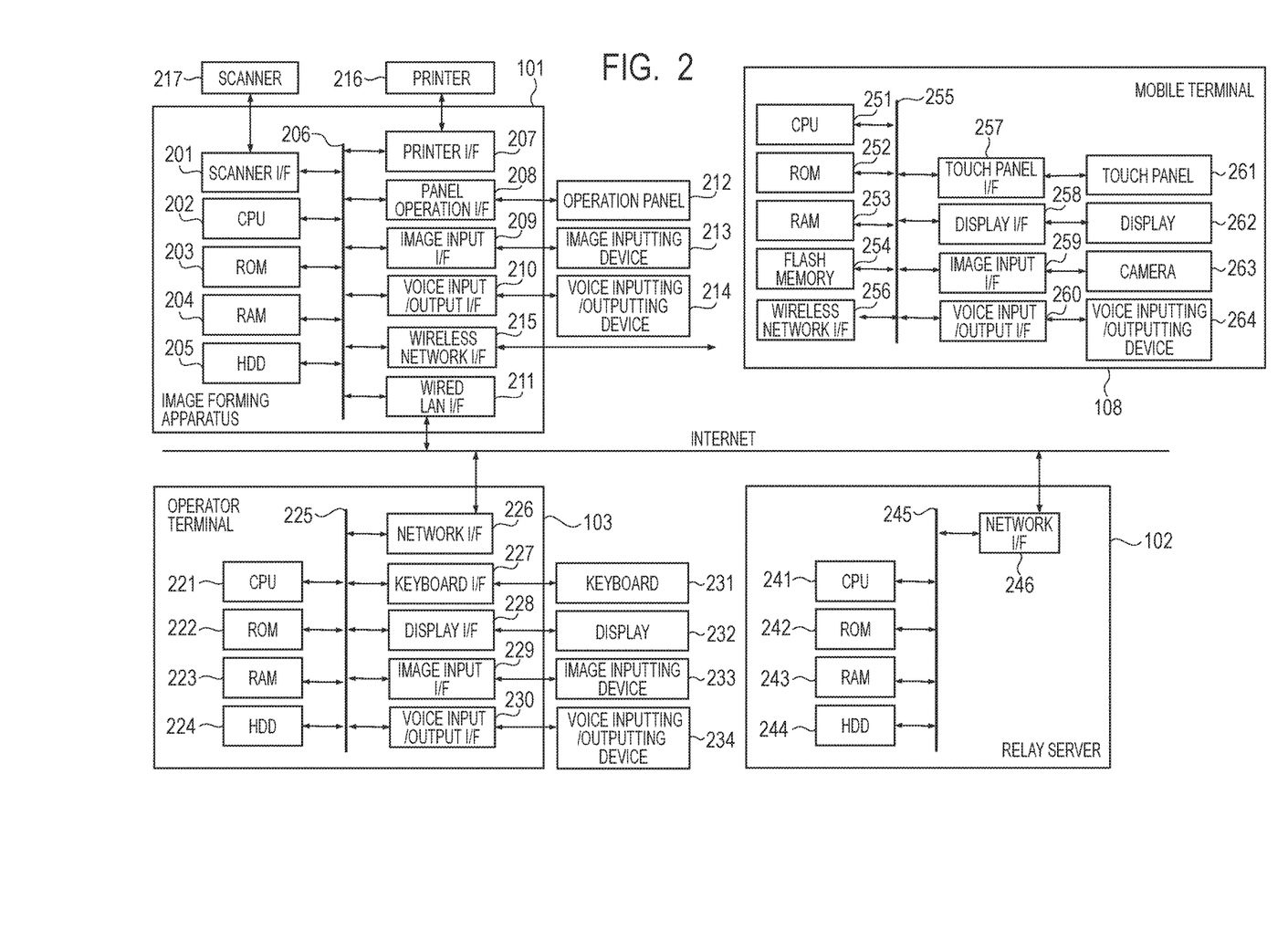
FIG. 2 is a view illustrating an example of the hardware configuration of each device of the remote maintenance system.

FIG. 2 is a view illustrating an example of the hardware configuration of the image forming apparatus 101, the relay server 102, the operator terminal 103 and the mobile terminal 108 of the remote maintenance system. In the image forming apparatus 101, a CPU 202 performs overall control of access to various devices connected to a system bus 206 based on a program stored on a ROM 203 or a hard disk (HDD) 205. The ROM 203 stores programs that are executable by the CPU 202 and the like. A RAM 204 mainly functions as a main memory and a work area or the like of the CPU 202, and is configured so that the memory capacity thereof can be expanded by an optional RAM that is connected to an extension port. The hard disk (HDD) 205 stores a boot program, various application programs, font data, user files, editing files and the like. Although the HDD 205 is used in the present embodiment, apart from the HDD 205, an SD card or a flash memory or the like may be utilized as an external storage apparatus. A scanner I/F 201 controls the input of images from a scanner 217. A printer I/F 207 controls the output of images to a printer 216. A panel operation I/F 208 controls the display on an operation panel 212 and controls the input of various kinds of settings information that is set using the operation panel 212. An image input I/F 209 controls the input of images from an image inputting device 213 such as a camera. A voice input/output I/F 210 controls the input/output of voice data to and from a voice inputting/outputting device 214 such as a headset. A network cable is connected to a wired LAN I/F 211, and the wired LAN I/F 211 executes communication (wired communication) with external apparatuses. A wireless LAN I/F 215 executes wireless communication with external apparatuses such as the mobile terminal 108 or a PC. A software configuration illustrated in FIG. 3 that is described later and processing of a flowchart illustrated in FIG. 4 that is described later are realized by execution by the CPU 202 of processing based on a program stored in the ROM 203 or the HDD 205. Further, processing of the image forming apparatus 101 that is illustrated in sequence diagrams in FIG. 5, FIG. 8 and FIG. 10 that are described later is realized by execution by the CPU 202 of processing based on programs stored in the ROM 203 or the HDD 205.

In the operator terminal 103, a CPU 221 performs overall control of access to various devices connected to a system bus 225 based on a control program stored on a ROM 222 or a hard disk (HDD) 224. The ROM 222 stores a control program that is executable by the CPU 221 and the like. A RAM 223 mainly functions as a main memory and a work area or the like of the CPU 221, and is configured so that the memory capacity thereof can be expanded by an optional RAM that is connected to an extension port. The hard disk (HDD) 224 stores a boot program, various application programs, font data, user files, editing files and the like. Although the HDD 224 is used in the present embodiment, apart from the HDD 224, an SD card or a flash memory or the like may be utilized as an external storage apparatus. A network I/F 226 conducts data communication with an external network through a network cable. A keyboard I/F 227 controls key inputs from a keyboard 231 or a pointing device. A display I/F 228 controls the display on a display 232. An image input I/F 229 controls the input of images from an image inputting device 233 such as a camera. A voice input/output I/F 230 controls the input/output of voice data to and from a voice inputting/outputting device 234 such as a headset. Functions of the operator terminal 103 and processing of the operator terminal 103 illustrated in sequence diagrams in FIG. 5, FIG. 8 and FIG. 10 that are described later are realized by execution by the CPU 221 of processing based on programs stored in the ROM 222 or the HDD 224.

In the relay server 102, a CPU 241 performs overall control of access to various devices connected to a system bus 245 based on control programs stored on a ROM 242 or a hard disk (HDD) 244. The ROM 242 stores a control program that is executable by the CPU 241 and the like. A RAM 243 mainly functions as a main memory and a work area or the like of the CPU 241, and is configured so that the memory capacity thereof can be expanded by an optional RAM that is connected to an extension port. The hard disk (HDD) 244 stores a boot program, various application programs, font data, user files, editing files and the like. Although the HDD 244 is used in the present embodiment, apart from the HDD 244, an SD card or a flash memory or the like may be utilized as an external storage apparatus. A network I/F 246 conducts data communication with an external network through a network cable. Functions of the relay server 102 and processing of the relay server 102 illustrated in sequence diagrams in FIG. 5, FIG. 8 and FIG.

Figure 10:
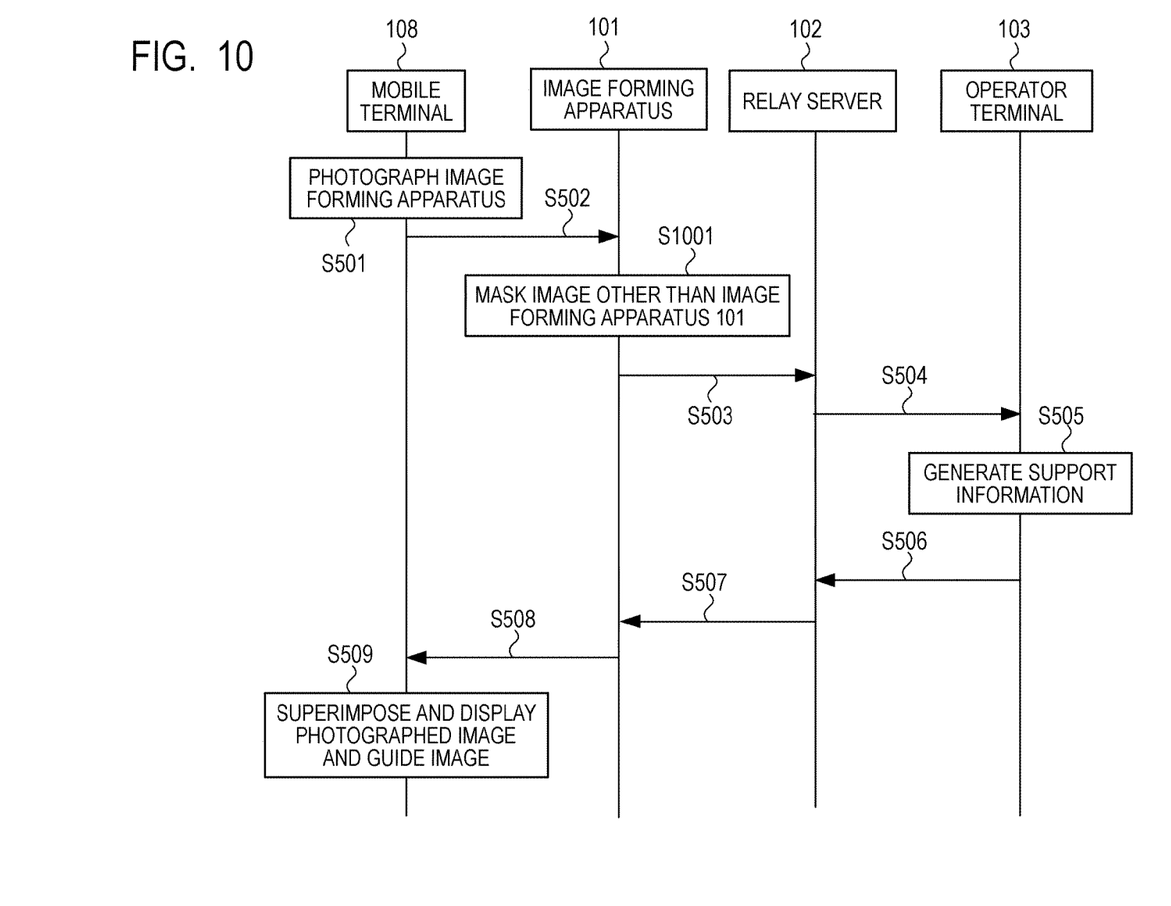
FIG. 10 is a view illustrating a sequence of processing in a remote maintenance system according to Embodiment 3.

10 that are described later are realized by execution by the CPU 241 of processing based on programs stored in the ROM 242 or the HDD 244.

In the mobile terminal 108, a CPU 251 performs overall control of access to various devices connected to a system bus 255 based on a control program stored on a ROM 252 or a flash memory 254. The ROM 252 stores a control program that is executable by the CPU 251 and the like. A RAM 253 mainly functions as a main memory and a work area or the like of the CPU 251. The flash memory 254 stores a boot program, various application programs, font data, user files, editing files and the like. Although the flash memory 254 is used in the present embodiment, apart from the flash memory 254, an SD card or the like may be utilized as an external storage apparatus. A wireless network I/F 256 executes wireless communication with the image forming apparatus 101. A touch panel I/F 257 controls inputs from a touch panel 261. A display I/F 258 controls the display on a display 262. An image input I/F 259 controls the input of images from a camera 263. A voice input/output I/F 260 controls the input/output of voice data to and from a voice inputting/outputting device 264 such as a headset. Functions of the mobile terminal 108 and processing of the mobile terminal 108 illustrated in sequence diagrams in FIG. 5, FIG. 8 and FIG. 10 that are described later are realized by execution by the CPU 251 of processing based on programs stored in the ROM 252 or the flash memory 254.

Figure 3:
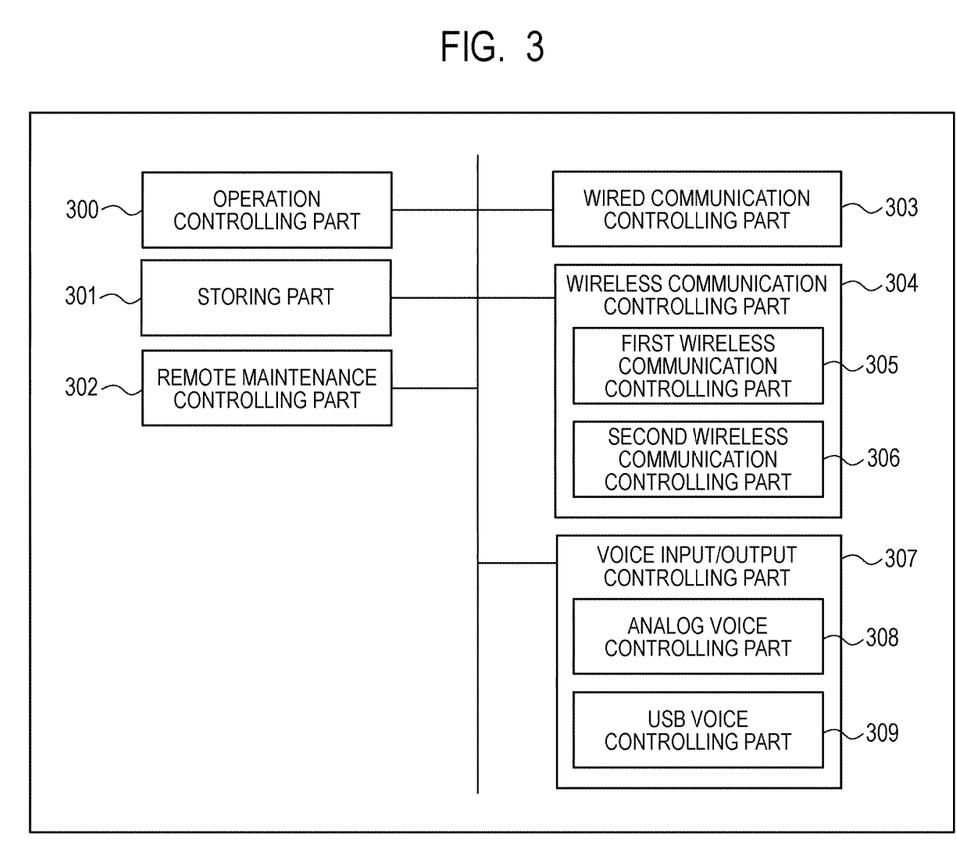
FIG. 3 is a view illustrating an example of the software configuration of an image forming apparatus.

FIG. 3 is a view illustrating an example of the software configuration of the image forming apparatus 101. An operation controlling part 300 controls the operation panel 212. The operation controlling part 300 displays an operation menu on the operation panel 212 through the panel operation I/F 208, and awaits the input of an instruction from the user. Further, the operation controlling part 300 notifies the contents of an instruction that is received at the operation panel 212 to other functional parts, and displays the results of the instruction on the operation panel 212. In accordance with an instruction from another functional part, a storing part 301 stores specified data on the RAM 204 or the HDD 205, or reads out data that is stored on the RAM 204 or the HDD 205. A remote maintenance controlling part 302 performs control of a remote maintenance function. The remote maintenance controlling part 302 conducts HTTP communication with the relay server 102 through a wired communication controlling part 303. By means of the HTTP communication, the remote maintenance controlling part 302 transmits and receives voice data, moving image data and remote operation data. The remote maintenance controlling part 302 inputs/outputs voice data to and from the voice inputting/outputting device 214 through a voice input/output controlling part 307. The details of the voice input/output controlling part 307 are described later. The remote maintenance controlling part 302 transmits and receives moving images and still images that were photographed on the operator terminal 103 side or by the mobile terminal 108 on the user side via the relay server 102. The remote maintenance controlling part 302 makes a request to the operation controlling part 300 to display a received moving image or still image on the operation panel 212. The operation controlling part 300 displays the moving image or still image on the operation panel 212 through the panel operation I/F 208. Further, based on remote operation data, the remote maintenance controlling part 302 conducts communication with the operation controlling part 300 and executes s remote operation. Data that is communicated using the VNC (Virtual Network Computing) protocol may be mentioned as an example of the remote operation data. The remote maintenance controlling part 302 transmits an operation command to the operation controlling part 300 in accordance with the VNC protocol. The operation controlling part 300 operates the operation panel 212 through the panel operation I/F 208 in accordance with the transmitted operation command. By means of the above described processing of the remote maintenance controlling part 302, the operator terminal 103 that is first connected to the relay server 102 can perform remote maintenance of the image forming apparatus 101. In addition, by wireless communication through a wireless communication controlling part 304, the remote maintenance controlling part 302 can also input and output image data (still image data and moving image data) to and from the mobile terminal 108. By this means the user 106 can show an image of the image forming apparatus 101 that was photographed using the mobile terminal 108 to the operator 107, and can view an image that was sent from the operator 107 on the mobile terminal 108. The wireless communication includes a first wireless communication mode and a second wireless communication mode. In the first wireless communication mode, when the image forming apparatus 101 performs wireless communication with an external apparatus such as the mobile terminal 108, the image forming apparatus 101 and the mobile terminal 108 perform wireless communication through different access points. A first wireless communication controlling part 305 controls the first wireless communication mode. In the second wireless communication mode, when the image forming apparatus 101 conducts wireless communication with an external apparatus such as the mobile terminal 108, the image forming apparatus 101 conducts the wireless communication directly using Wi-Fi (registered trademark) Direct. In the second wireless communication mode, when the image forming apparatus 101 communicates, for example, with the mobile terminal 108, either one of the image forming apparatus 101 and the mobile terminal 108 operates as an access point and the other operates as a client. By this means, the image forming apparatus 101 and the mobile terminal 108 wirelessly connect and perform communication directly. A second wireless communication controlling part 306 controls the second wireless communication mode. The voice input/output controlling part 307 provides an audio device and a device driver that inputs/outputs voice data. ALSA (Advanced Linux (registered trademark) Sound Architecture) or OSS (Open Sound System) or the like may be mentioned as examples of the device driver. An analog voice controlling part 308 and a USB voice controlling part 309 are present as parts of the voice input/output controlling part 307. By means of these controlling parts, voice data is input to and output from the voice input/output I/F 210.

Figure 4:
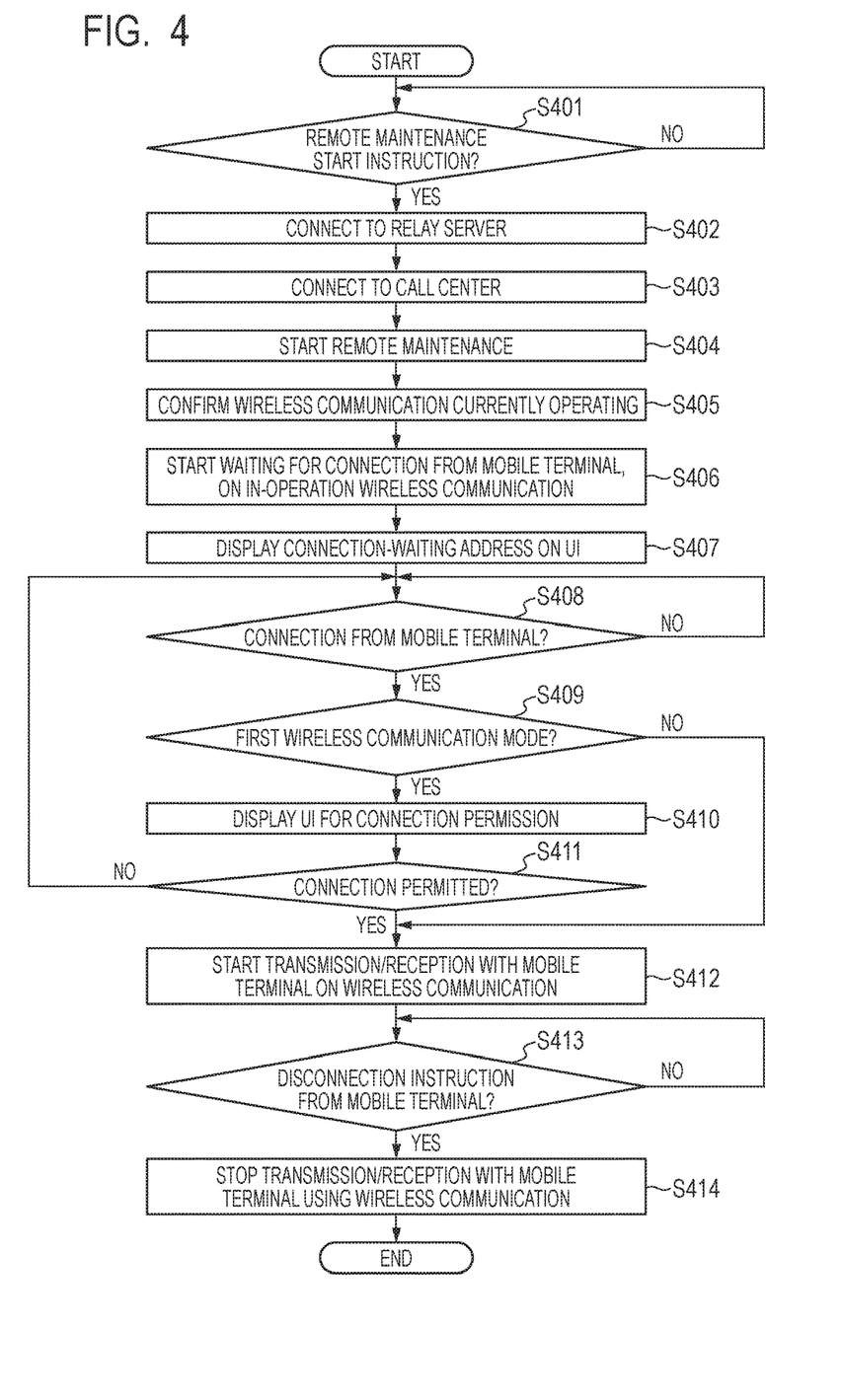
FIG. 4 is a flowchart illustrating an example of information processing of the image forming apparatus.

FIG. 4 is a flowchart illustrating an example of information processing of the image forming apparatus 101. In S401, the remote maintenance controlling part 302 determines whether or not there is a start remote maintenance instruction by the user that is input from the operation panel 212. If the remote maintenance controlling part 302 determines that there is no instruction ("NO" in S401), the remote maintenance controlling part 302 repeats the processing in S401 and awaits a start remote maintenance instruction, and when the remote maintenance controlling part 302 determines that there is an instruction ("YES" in S401), the remote maintenance controlling part 302 proceeds to S402. In S402, the remote maintenance controlling part 302 reads out the URL of the relay server 102 from the HDD 205, and makes a HTTP connection to the relay server 102. In S403, the remote maintenance controlling part 302 establishes a session with the operator terminal 103 through the relay server 102. In S404, the remote maintenance controlling part 302 performs processing to transmit and receive a remote operation instruction and various kinds of support information to and from the operator terminal 103 to thereby start remote maintenance. In S405, the remote maintenance controlling part 302 checks whether the wireless communication mode that is currently operating is the first wireless communication mode or the second wireless communication mode. In S406, the remote maintenance controlling part 302 requests the controlling part that corresponds to the wireless communication mode that was confirmed as currently operating in S405 (the first wireless communication controlling part 305 or the second wireless communication controlling part 306) to begin processing to await a connection from the mobile terminal 108. Examples of the protocol that is used for communication with the mobile terminal 108 include SIP (Session Initiation Protocol) and HTTP, and another protocol may also be used. In S407, on the operation panel 212, the remote maintenance controlling part 302 displays information regarding the address that is awaiting a connection. The address information may be in the form of a URL or may be in another form. Furthermore, the remote maintenance controlling part 302 may display the information as text, or may display the information as a barcode or a QR code (registered trademark). In S408, the remote maintenance controlling part 302 determines whether or not a connection was received from the mobile terminal 108. If a connection was received ("YES" in S408), the remote maintenance controlling part 302 proceeds to S409, and if a connection was not received ("NO" in S408), the remote maintenance controlling part 302 repeats the processing in S408. In S409, the remote maintenance controlling part 302 determines whether the wireless communication mode when the connection was received is the first wireless communication mode or the second wireless communication mode.

The flow of operations on the mobile terminal 108 side at such time will now be described. The user 106 opens the Wi-Fi settings screen of the mobile terminal 108, and performs a search for a Wi-Fi access point. If the Wi-Fi access point that is found is a Wi-Fi access point that is publically available on a network in the user's environment, the mobile terminal 108 connects in the first wireless communication mode to the image forming apparatus 101. If the Wi-Fi access point that is found is the Wi-Fi access point of the image forming apparatus 101, the mobile terminal 108 connects in the second wireless communication mode to the image forming apparatus 101. On the mobile terminal 108, the user 106 selects the Wi-Fi access point that was found and enters a password for connecting. The Wi-Fi access point performs an operation to verify the password, and if the password is correct the Wi-Fi access point establishes a Wi-Fi connection with the mobile terminal 108. Subsequently, the user 106 performs an operation from the mobile terminal 108 to connect to the address that is displayed on the operation panel 212 in S407. As an example, a connection using SIP will be described. The user 106 performs an operation to register the URL information for SIP that is displayed on the operation panel 212 in S407 in the address book of the mobile terminal 108. The user 106 activates an SIP application at the mobile terminal 108, selects the SIP URL that was registered, and executes a call operation. On the image forming apparatus 101 side, the present connection is detected in S408. Upon detecting the connection in S408, the remote maintenance controlling part 302 proceeds to S409. In S409, the remote maintenance controlling part 302 determines whether or not the current wireless communication mode is the first wireless communication mode. If the remote maintenance controlling part 302 determines that the current wireless communication mode is the first wireless communication mode ("YES" in S409), the remote maintenance controlling part 302 proceeds to S410, while if the remote maintenance controlling part 302 determines that the current wireless communication mode is the second wireless communication mode ("NO" in S409), the remote maintenance controlling part 302 proceeds to S412. The second wireless communication mode is a mode in which the mobile terminal 108 and the image forming apparatus 101 connect directly. Accordingly, in S409, since the remote maintenance controlling part 302 can identify that the connection that is received is the mobile terminal 108, the processing in S410 and S411 described later that relate to a determination by the user regarding permission is not required. In S410, the remote maintenance controlling part 302 displays a screen prompting the input of connection permission on the operation panel 212. In the first wireless communication mode it is possible for a plurality of external apparatuses to connect to access points that exist separately from each other. Accordingly, there is a possibility that the connection received in S408 is from an unintended external apparatus. Therefore, in the case of the first wireless communication mode, in S410, the remote maintenance controlling part 302 displays a screen for determining whether or not to permit the connection on the operation panel 212, and allows the user 106 to determine. In S411, the remote maintenance controlling part 302 determines whether or not an instruction to permit the connection was input via the panel operation I/F 208. If the remote maintenance controlling part 302 determines that the user input an instruction indicating permission for the connection ("YES" in S411), the remote maintenance controlling part 302 proceeds to S412, while if the remote maintenance controlling part 302 determines that the user did not input an instruction indicating permission for the connection ("NO" in S411), the remote maintenance controlling part 302 returns to S408. In S412, the remote maintenance controlling part 302 starts processing to transmit and receive various data to and from the mobile terminal 108 using wireless communication. RTP (Real-Time Transport Protocol) may be mentioned as an example of the protocol that is used when the remote maintenance controlling part 302 transmits/receives image data to/from the mobile terminal 108. However, the protocol is not limited to RTP, and image data may be transmitted and received using another protocol. In S413, the remote maintenance controlling part 302 determines whether or not the communication was ended by the mobile terminal 108. If the remote maintenance controlling part 302 determines that the communication was ended by the mobile terminal 108 ("YES" in S413), the remote maintenance controlling part 302 proceeds to S414, while if the remote maintenance controlling part 302 determines that the communication was not ended by the mobile terminal 108 ("NO" in S413), the remote maintenance controlling part 302 repeats the processing in S413. In S414, the remote maintenance controlling part 302 stops the data transmission/reception (data exchange) with the mobile terminal 108 using the wireless communication, and disconnects the connection.

Figure 5:
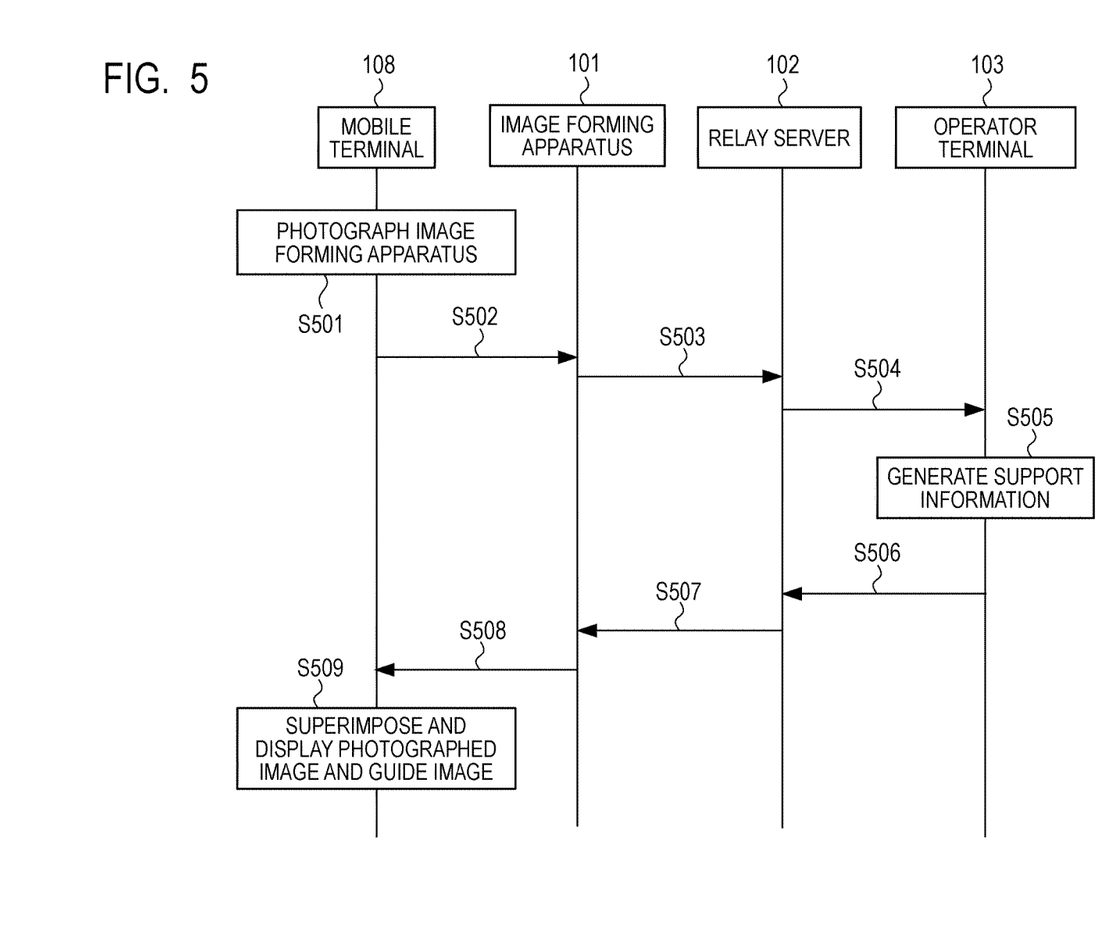
FIG. 5 is a view illustrating a sequence of processing in a remote maintenance system according to Embodiment 1.
Figure 6A:
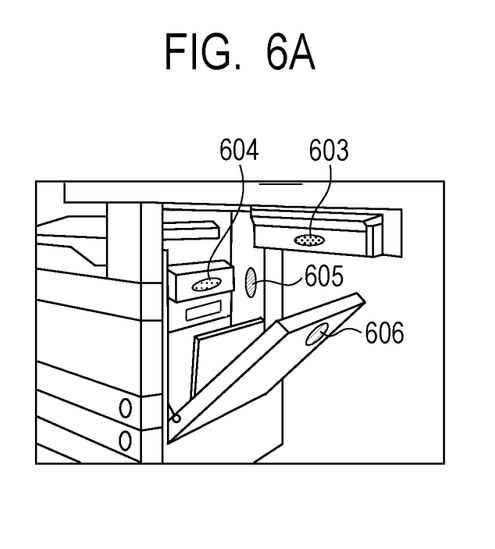
FIGS. 6A and 6B are views illustrating an example of image data and support information.
Figure 6B:
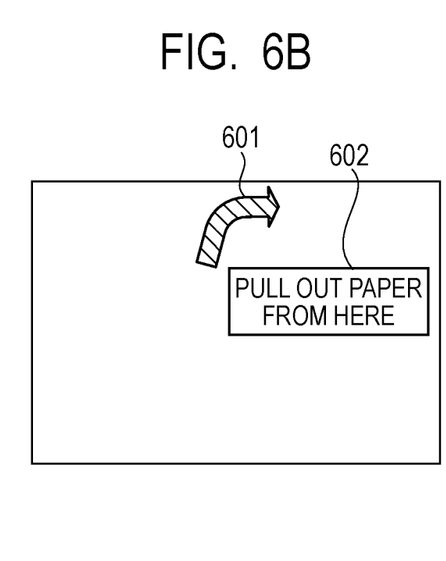

FIG. 5 is a view illustrating a sequence of operations in Embodiment 1 in a case where a paper jam occurred at the image forming apparatus 101, and the user receives support from a call center to clear the paper jam. The image forming apparatus 101 and the mobile terminal 108 are wirelessly connected by the processing from S401 to S412 in FIG. 4, and the image forming apparatus 101 and the operator terminal 103 are connected through the relay server 102. In S501, based on a photographing operation by the user 106 that is performed through the touch panel 261 or the like, the mobile terminal 108 starts photographing of the image forming apparatus 101 using the camera 263 of the mobile terminal 108. It is assumed that the operator 107 of the call center gives instructions by voice communication or the like to the user 106 regarding the specific photographing position and method. For example, in order to clear the jam, the operator 107 instructs the user 106 to photograph the image forming apparatus 101 in a state in which a specific door of the image forming apparatus 101 is open. Markers are provided at respective places on the exterior surface of the image forming apparatus 101 and at respective places inside the image forming apparatus 101 in a state in which each door of the image forming apparatus 101 is open. The markers are given a different color, pattern, symbol or the like to each other, and it is thus possible to identify the positions of the respective markers. The image data that is photographed by the mobile terminal 108 is an image that also includes such markers. In S502, the mobile terminal 108 displays the photographed image on the display 262 of the mobile terminal 108 in real-time, and also transmits the photographed image to the image forming apparatus 101. In S503 and S504, the image forming apparatus 101 transmits the image data that was received from the mobile terminal 108 to the operator terminal 103 through the relay server 102. The operator terminal 103 displays the received image data on the display 232. The operator 107 at the call center checks the location at which paper is jammed by looking at the image data displayed on the display 232. Thereafter, the operator 107 instructs the operator terminal 103 to generate support information for supporting the user in clearing the jam. In S505, the operator terminal 103 generates support information based on an instruction of the operator 107 through the keyboard 231 or the display 232 or the like. The support information includes a guide image (guide information) and coordinate information that shows a location displayed by the guide image. The guide image is an image that shows the user 106 which door should be opened, the location of a lever that should be operated, and the method for operating the lever, and indicates the place at which paper that is the cause of the jam is caught. Information regarding devices that are the objects of support, information regarding jam locations, and past maintenance information is collected and held in a database, and the database is stored on the HDD 224 or the like of the operator terminal 103. The operator 107 uses the operator terminal 103 to read out appropriate information as the support information from the database stored on the HDD 224 or the like. Alternatively, the operator terminal 103 may be configured so as to generate support information that is based on the past experience of the operator 107, based on an operation performed by the operator 107 through the keyboard 231 or the display 232. FIG. 6A is a view illustrating an example of image data that is photographed in S501, and which is displayed on the operator terminal 103. FIG. 6B is a view illustrating an example of support information. In FIG. 6B, an arrow image 601 showing the direction in which to remove jammed paper and a message 602 describing an operation are provided as the guide images. In FIG. 6A, reference characters 603, 604, 605 and 606 denote markers, and these markers are attached at various places in the image forming apparatus 101. Because the locations at which the markers are attached are determined for each device, it is possible to identify the position that is photographed and photographing angle based on the relation between the locations at which a plurality of markers are seen in the photographed image. The operator terminal 103 calculates coordinate information for which a guide image should be displayed, based on the positions of the markers that are seen in the photographed image. Subsequently, in S506 and S507, the operator terminal 103 transmits the calculated coordinate information and guide image as support information to the image forming apparatus 101 through the relay server 102. In S508, the image forming apparatus 101 transmits the received support information to the mobile terminal 108. In S509, based on the coordinate information included in the received support information, the mobile terminal 108 uses augmented reality (AR) technology to superimpose the guide image included in the support information and the photographed image, and displays the resultant image on the display 262.

Figure 7:
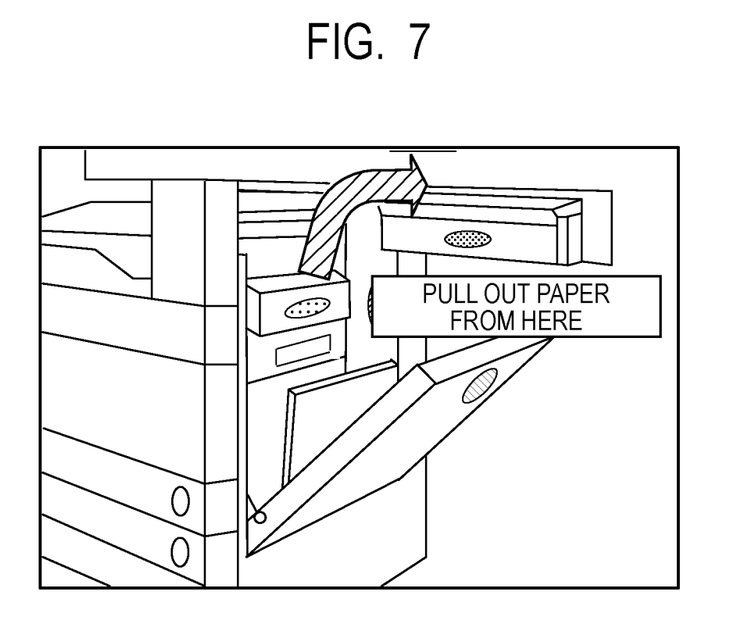
FIG. 7 is a view illustrating an example of superimposing and displaying.

FIG. 7 is a view illustrating an example of the image that is displayed on the display 262 of the mobile terminal 108. The guide image (FIG. 6B) transmitted from the operator terminal 103 is superimposed on the image (FIG. 6A) that was photographed by the camera 263 of the mobile terminal 108, and the resultant image is displayed.

As described above, according to the present embodiment, the guide image transmitted from the call center is superimposed on an image of the image forming apparatus 101 that was photographed by the mobile terminal 108, and the resultant image is displayed. Therefore, the user 106 can intuitively comprehend the operation to perform that is instructed by the operator 107.

Embodiment 2

In Embodiment 1 an example was described in which a support image is transmitted from the operator terminal 103. In Embodiment 2, the operator terminal 103 transmits identification information that indicates a specific position in the image forming apparatus 101, and at the image forming apparatus 101 a position image in which the color of a specific position corresponding to the identification information is transmitted to the mobile terminal 108.

Figure 8:
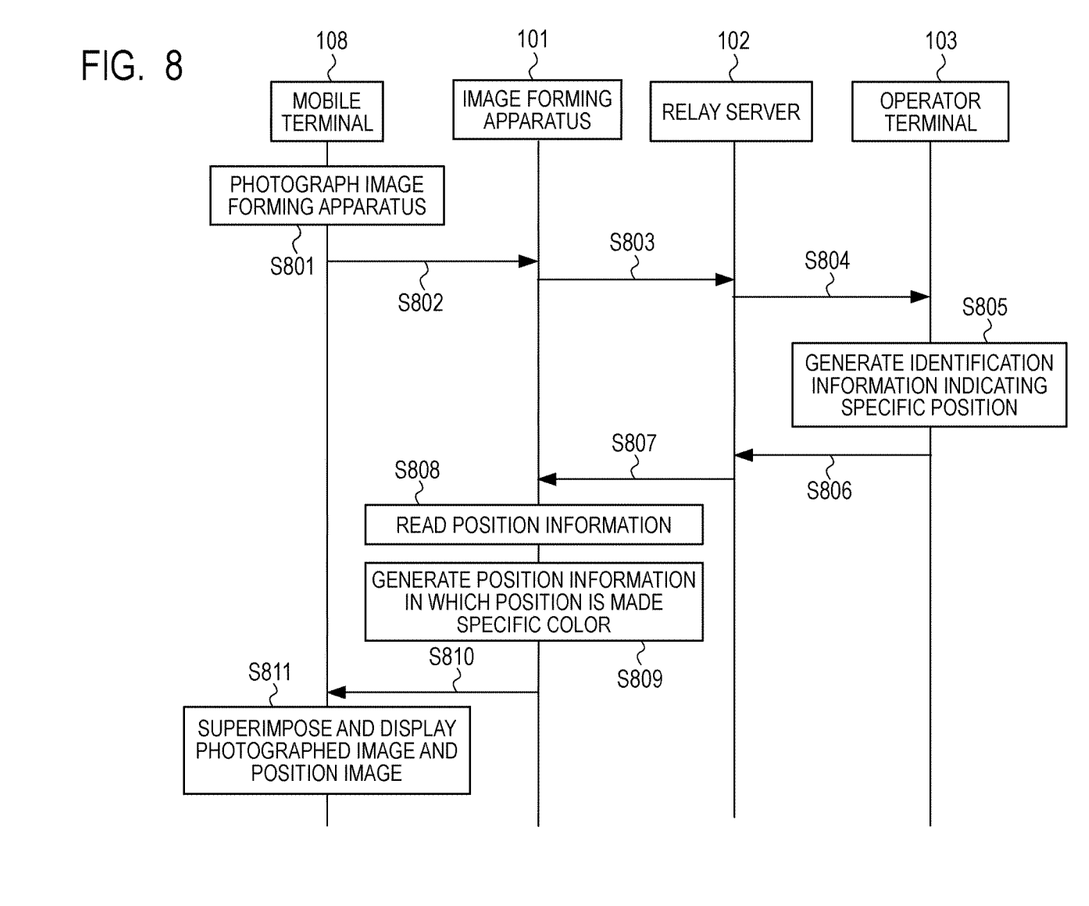
FIG. 8 is a view illustrating a sequence of processing in a remote maintenance system according to Embodiment 2.

FIG. 8 is a view illustrating a sequence of operations according to Embodiment 2 in a case where a jam occurs at the image forming apparatus 101, and support is received from a call center to clear the jam. Similarly to Embodiment 1, the image forming apparatus 101 and the mobile terminal 108 are wirelessly connected by the processing from S401 to S412, and the image forming apparatus 101 and the operator terminal 103 are connected through the relay server 102.

The processing from S801 to S804 is the same as the processing from S501 to S504 in FIG. 5, and therefore a description thereof is omitted here. The operator 107 at the call center checks the location at which paper is jammed by looking at the image data which was received in S804 and which is displayed on the display 232 of the operator terminal 103. Thereafter, the operator 107 identifies the location at which it is required to perform an operation to clear the jam (for example, a lever A), and inputs identification information for the location or the like into the operator terminal 103. In S805, the operator terminal 103 generates identification information indicating a specific position based on an input operation of the operator 107 through the keyboard 231, the display 232 or the like. In the present embodiment, identification information is information that uniquely identifies various positions in the image forming apparatus 101, and is assigned to all doors, levers, knobs and rollers and the like that are used for maintenance of the image forming apparatus 101. In S806 and S807, the operator terminal 103 transmits the identification information to the image forming apparatus 101 via the relay server 102. In S808, the image forming apparatus 101 reads out the position corresponding to the received identification information from a position information table. The position information table is stored in advance on the HDD 205 of the image forming apparatus 101, and is a table that holds the identifiers for each position of the image forming apparatus 101, and coordinate information (x-coordinate, y-coordinate, z-coordinate) within the device for the respective positions as well as shape data for the respective positions. After reading out the position information, in S809 the image forming apparatus 101 generates an image in which the color of the specific position is made a specific color (for example, red). In this case, based on the mutual relation between markers that appear in the image of the image forming apparatus 101 that was photographed by the mobile terminal 108, the image forming apparatus 101 can identify the photographed location and the photographing direction of the mobile terminal 108. The image forming apparatus 101 analyzes the location and shape of the specific position in the image using the information in the position information table, and generates an image in which the color of the specific position is made a specific color. The image forming apparatus 101 need not make the specific position a specific color, and may instead, for example, display the specific position in a blinking manner by periodically varying the color or brightness of the specific position in an image, or may generate an image that indicates the specific position by means of an arrow or the like. In S810, the image forming apparatus 101 transmits the generated image and coordinate information to the mobile terminal 108. In S811, the mobile terminal 108 uses augmented reality (AR) technology to superimpose the received position image and the photographed image based on the received coordinate information, and displays the resultant image on the display 262.

Figure 9A:
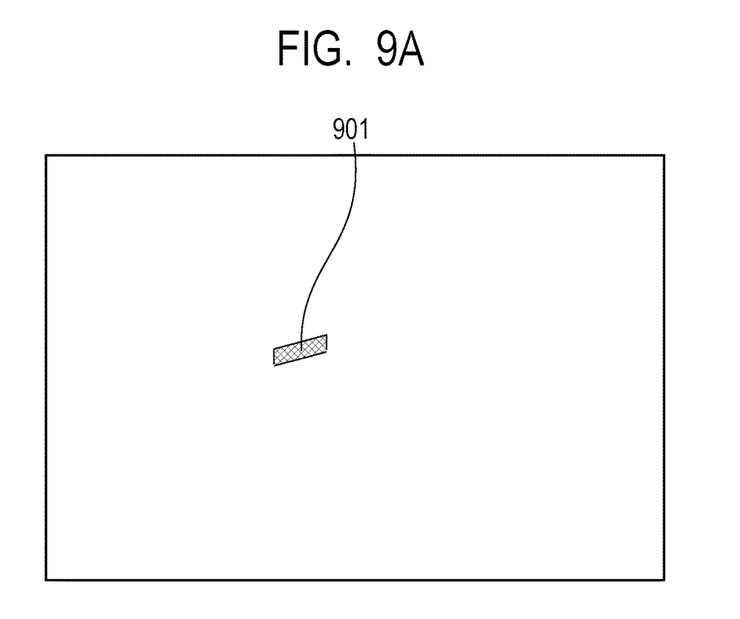
FIGS. 9A and 9B are views illustrating an example of an image of a specific position, and superimposing and displaying.
Figure 9B:
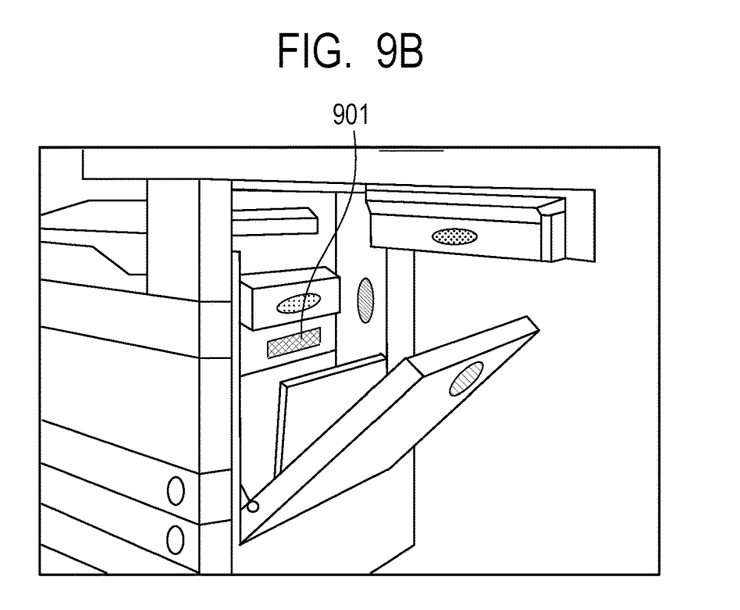

FIG. 9A is a view illustrating an example of a position image generated by the image forming apparatus 101. FIG. 9B is a view illustrating an example of an image obtained by the mobile terminal 108 by superimposing and displaying images. Reference numeral 901 denotes the specific position, and in this case the image is one in which the lever A is colored red. Because the lever A is superimposed and displayed in a red color on the image of the image forming apparatus 101 that was photographed by the mobile terminal 108, the user 106 can immediately identify the operation location that is instructed by the operator 107.

As described above, according to the present embodiment, the specific position which the operator 107 at the call center instructs the user to perform an operation at for maintenance is superimposed and displayed on the image of the image forming apparatus 101 photographed by the mobile terminal 108 in a manner in which the specific position stands out. Therefore, the user 106 can intuitively comprehend the position at which an operation should be performed.

Embodiment 3

When the user 106 photographs the image forming apparatus 101, in some cases items other than the image forming apparatus 101 that are present around the image forming apparatus 101 may also appear in the photographed image, and it may not be desirable from a security standpoint to send the photographed image as it is to a call center. Embodiment 3 addresses this problem. According to Embodiment 3, in addition to the configuration of Embodiment 1 or Embodiment 2, when transmitting an image from the image forming apparatus 101 to the operator terminal 103, a configuration is adopted so that an image of a region other than the image forming apparatus 101 is not sent to the operator terminal 103.

FIG. 10 is a view illustrating a sequence of operations in Embodiment 3 in a case where a jam occurs in the image forming apparatus 101, and support is received from a call center to clear the jam. Similarly to Embodiment 1, the image forming apparatus 101 and the mobile terminal 108 are wirelessly connected by the processing from S401 to S412, and the image forming apparatus 101 and the operator terminal 103 are connected through the relay server 102.

The processing of each step from S501 to S509 is the same as in Embodiment 1, and therefore a description thereof is omitted here. In S1001, the image forming apparatus 101 performs processing that masks a region other than the image forming apparatus 101 in the image transmitted from the mobile terminal 108. More specifically, the image forming apparatus 101 identifies the region of the image forming apparatus 101 from characteristics data of the image forming apparatus 101. The characteristics data is information such as the location, shape, size and color of each part of the image forming apparatus 101, and is stored in advance on the HDD 205 of the image forming apparatus 101. Based on the mutual relation between markers that appear in the image of the image forming apparatus 101 that was photographed by the mobile terminal 108, the image forming apparatus 101 identifies the photographed location and photographing direction of the mobile terminal 108. The image forming apparatus 101 then uses the information of the characteristics data to separate the image received from the mobile terminal 108 into a region of the image forming apparatus 101 and a region other than the image forming apparatus 101. Next, the image forming apparatus 101 generates an image in which the region other than the image forming apparatus 101 is masked, and transmits the image to the operator terminal 103 via the relay server 102.

Although the description of the present embodiment illustrated in FIG. 10 in based on the sequence of operations described in Embodiment 1, the processing in S1001 may also be added to the sequence of operations described in Embodiment 2.

As described above, according to the present embodiment, an image of a portion other than the image forming apparatus 101 that is included in an image photographed by the mobile terminal 108 is not sent to the operator terminal 103. Therefore, even if there is confidential information in the area around the image forming apparatus 101, the information cannot be seen by the operator 107 at the call center. When asking a call center for support for maintenance of the image forming apparatus 101, the user 106 can transmit an image of the image forming apparatus 101 to the call center and receive support without worrying about leaking confidential information.

Other Embodiments

The present invention is realized by a process in which a program that realizes one or more functions according to the above embodiments is supplied to a system or an apparatus through a network or a storage medium. The present invention can also be realized by a process in which one or more processors in a computer of the system or the apparatus read and execute the program. In addition, the present invention can be realized by a circuit (for example, an ASIC) that realizes the one or more functions.

Although an example of embodiments of the present invention have been described in detail above, the present invention is not limited to the specific embodiments described above.

A part or all of the software configuration of the image forming apparatus 101 described above may be implemented as a hardware configuration in the image forming apparatus 101.

Further, as the hardware configuration of the image forming apparatus 101, it is not necessary that the number of CPUs, ROMs, RAMs and HDDs is only one, respectively. A configuration may also be adopted so as to realize the functions and the like of the image forming apparatus 101 by means of a plurality of CPUs that execute processing based on programs while using data and the like stored in a plurality of ROMs, RAMs and HDDs.

Further, a GPU (Graphics Processing Unit) or the like may be used instead of a CPU.

Furthermore, in the respective embodiments, an image that is photographed by the mobile terminal 108 may be a moving image or may be a still image. Also, apart from a form that uses Wi-Fi, the communication between the image forming apparatus 101 and the mobile terminal 108 may be near-field wireless communication that is accompanied by a pairing operation, such as Bluetooth (registered trademark) communication. Further, the image forming apparatus 101 may temporarily retain an image received from the mobile terminal 108 on the HDD 205 or the like inside the image forming apparatus 101, and not immediately transmit the image to the relay server 102. Image data stored in the image forming apparatus 101 may thereafter be obtained by the operator terminal 103 side, and displayed on the display 262 of the operator terminal 103.

According to the processing of the respective embodiments described above, assistance provided by an operator can be made easy to comprehend.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-129624, filed Jun. 30, 2017, which is hereby incorporated by reference herein in its entirety.

What is claimed is:

1. A system including an image forming apparatus, a mobile terminal, and an operator terminal, wherein
the image forming apparatus comprises:
a memory device that stores a set of instructions; and
at least one processor that executes the set of instructions to
receive from the mobile terminal an image of the image forming apparatus that is photographed by the mobile terminal,
transmit the image of the image forming apparatus to the operator terminal,
receive identification information showing a position in the image forming apparatus from the operator terminal,
obtain coordinate information of the position based on the identification information and generate an image of the position, and
transmit the coordinate information and the image of the position to the mobile terminal, and
the mobile terminal comprises:
a memory device that stores a set of instructions; and
at least one processor that executes the set of instructions to
photograph the image forming apparatus,
transmit an image of the image forming apparatus obtained by the photographing to the image forming apparatus,
receive the coordinate information and the image of the position from the image forming apparatus, and
based on the coordinate information, superimpose and display the image of the position and the photographed image of the image forming apparatus.

2. The system according to claim 1, wherein
in the image forming apparatus, the at least one processor executes instructions in the memory device to generate an image of the position in a specific color, and transmit the coordinate information and the image of the position in the specific color to the mobile terminal; and
in the mobile terminal, the at least one processor executes instructions in the memory device to, based on the coordinate information, superimpose and display the image of the position in the specific color and the photographed image of the image forming apparatus.

3. An information processing method for a system including an image forming apparatus, a mobile terminal and an operator terminal, the method comprising:
photographing the image forming apparatus by the mobile terminal;
transmitting an image of the image forming apparatus obtained by the photographing to the image forming apparatus, by the mobile terminal;
receiving, by the image forming apparatus, the image of the image forming apparatus that is photographed by the mobile terminal from the mobile terminal;
transmitting the image of the image forming apparatus to the operator terminal by the image forming apparatus;

receiving support information from the operator terminal by the image forming apparatus;

transmitting the support information to the mobile terminal by the image forming apparatus;

receiving the support information from the image forming apparatus by the mobile terminal; and based on coordinate information included in the support information, superimposing and displaying, by the mobile terminal, a guide image included in the support information and the photographed image of the image forming apparatus.

\* \* \* \* \*